Figure 1:
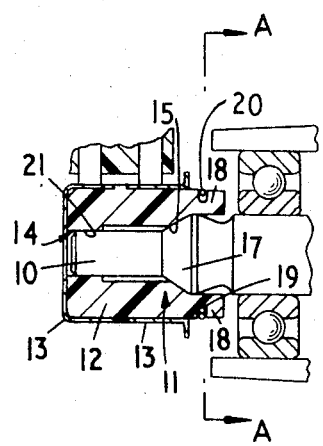

United States Patent [19]
Smith

[11] 3,842,301
[45] Oct. 15, 1974

[54] SLIP RING ASSEMBLIES FOR ROTARY ELECTRIC MACHINES

[75] Inventor: Roger Victor Frederick Smith, Great Barr, England

[73] Assignee: The Lucas Electrical Company Limited, Birmingham, England

[22] Filed: Dec. 28, 1973

[21] Appl. No.: 429,289

[30] Foreign Application Priority Data
Jan. 23, 1973   Great Britain ...................... 3391/73

[52] U.S. Cl. ................................. 310/232, 339/5 R
[51] Int. Cl. ........................................... H01r 39/14
[58] Field of Search ..................... 339/5 R, 5 S, 8 R; 310/232, 233, 234, 235, 219, 231, 43, 42

[56] References Cited
UNITED STATES PATENTS

| | | | |
|---|---|---|---|
| 2,718,604 | 9/1955 | Herrick | 310/232 |
| 3,129,350 | 4/1964 | Clark | 310/235 |
| 3,636,394 | 1/1972 | Forste et al. | 310/232 |
| 3,688,142 | 8/1972 | Forste et al. | 310/232 |

*Primary Examiner*—D. F. Duggan
*Attorney, Agent, or Firm*—Holman & Stern

[57] ABSTRACT

A slip ring assembly for a rotary electric machine includes a body of electrically insulating material and a pair of slip rings carried on the body in spaced relationship. The body is formed with an axial bore which in use receives one end of the rotor shaft of the rotary electric machine. A pair of resilient arms extend from the body, and coact with the rotor shaft in use to lock the slip ring assembly to the rotor shaft.

8 Claims, 8 Drawing Figures

3,842,301

SLIP RING ASSEMBLIES FOR ROTARY ELECTRIC MACHINES

This invention relates to slip ring assemblies for rotary electric machines and also to rotor shaft arrangements for rotary electric machines including such slip ring assemblies.

According to the present invention, there is provided a slip ring assembly for a rotary electric machine, comprising an electrically insulating body, a pair of slip rings carried on the body in spaced relationship, said body having an axial bore therein adapted to receive one end of the rotor shaft of the machine, and resilient clip means carried by said body and adapted to engage, in use, behind a shoulder on the shaft.

Also according to the present invention, there is provided a rotor shaft arrangement for a rotary electric machine, comprising a rotor shaft, and a slip ring assembly as defined in the last preceding paragraph, the resilient clip means being engaged with the shoulder on the shaft to hold the slip ring assembly on the rotor shaft.

The resilient clip means may comprise a pair of angularly spaced, resilient extensions projecting substantially parallel to the axis of the body and provided with inwardly facing projections thereon.

Alternatively, the resilient clip means may comprise a pair of angularly spaced extensions projecting from the body substantially parallel to the longitudinal axis thereof and having grooves in their radially outer surfaces, and a resilient ring mounted in said grooves so that portions of the resilient ring between the extensions engage, in use, behind the shoulder.

Most advantageously, the bore in the body extends completely therethrough and an inwardly projecting shoulder in the bore limits insertion of one end of the rotor shaft, in use, into the bore.

The bore in the insulating body may be provided with a frusto-conical end portion for engagement with a corresponding frusto-conical formation on the rotor shaft whereby the slip ring assembly is self-centering.

The slip rings may be interference fitted on the insulating body, or alternatively, the body may be formed, e.g. by a moulding operation, within the pair of slip rings.

Figure 2:
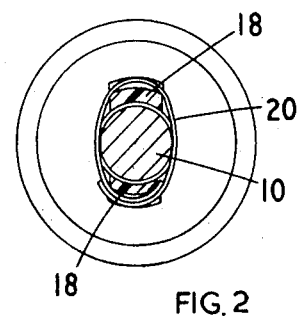
Figure 3:
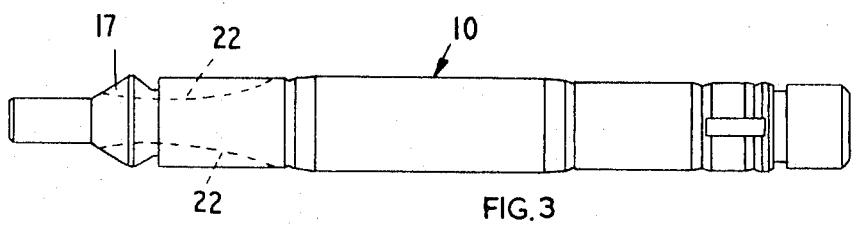
Figure 4:
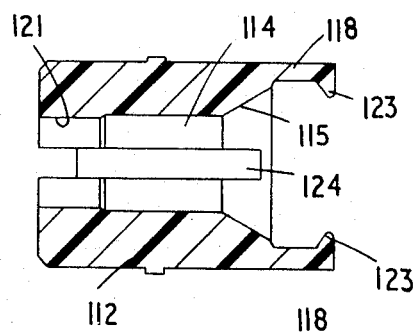
Figure 5:
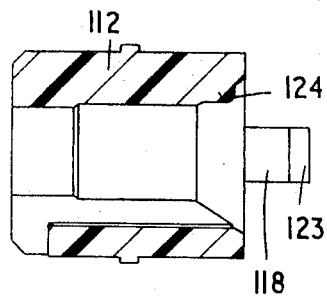
Figure 6:
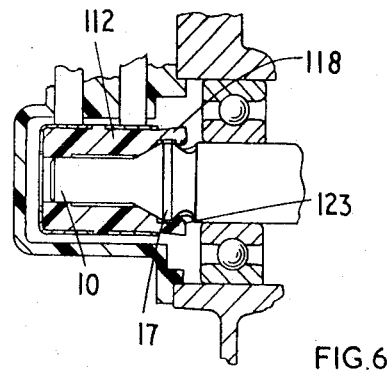
Figure 7:
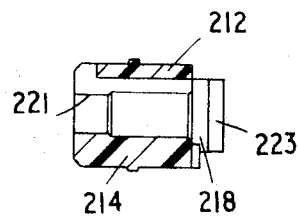
Figure 8:
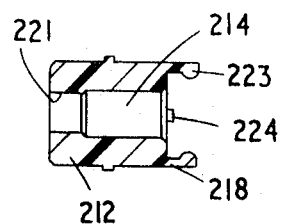

Embodiments of the present invention will now be described, by way of example, with reference to the accompanying drawing, in which:

FIG. 1 is a longitudinal sectional view of part of a rotor shaft arrangement incorporating a slip ring assembly according to the present invention, FIG. 2 is a section on the line a — a of FIG. 1, FIG. 3 is a side view of the rotor shaft, FIG. 4 is a longitudinal sectional view of an electrically insulating body for an alternative embodiment of slip ring assembly according to the present invention, FIG. 5 is a longitudinal sectional view at right angles to the sectional view of FIG. 4, FIG. 6 is a longitudinal sectional view of part of a rotor shaft arrangement incorporating the insulating body of FIGS. 4 and 5, FIG. 7 is a longitudinal sectional view of another electrically insulating body for a further embodiment of slip ring assembly according to the present invention, and FIG. 8 is a longitudinal sectional view at right angles to the sectional view of FIG. 7.

Referring first to FIGS. 1 to 3, the rotor shaft arrangement, which is for an alternator, comprises a rotor shaft 10 and a slip ring assembly 11 mounted on one end thereof. The slip ring assembly 11 comprises an electrically insulating body 12 formed by a moulding of glass-filled polybutylene terephthalate and a pair of slip rings 13 mounted on the body in axial spaced relationship. As can be best seen in FIG. 1, the body 12 has an axial bore 14 therethrough which accommodates one end of the rotor shaft 10. The bore 14 has a frusto-conical surface 15 at one end thereof which engages a corresponding frusto-conical surface on an annular shoulder 17 formed on the rotor shaft 10. The body 12 further includes a pair of integral, extensions 18 which extend away from the remainder of the body in a direction which is substantially parallel to the longitudinal axis thereof. The extensions 18 are angularly spaced apart on opposite sides of the longitudinal axis of the body 18. Each extension 18 is provided with a groove 19 in a radially outer surface thereof. A spring clip 20 is engaged in the grooves 19 and portions of the clip 20 between the extensions 18 are engaged behind the shoulder 17 to hold the assembly 11 in position on the rotor shaft 10 with the frusto-conical surface 15 serving to centralise the assembly 11 on the shaft 10. It is to be noted that the end of the rotor shaft 10 projects almost through the body 12 and engages a portion 21 of the bore 14 which is of reduced cross-section. Thus, the slip ring assembly 11 contacts the rotor shaft 10 over two axially spaced annular surfaces.

Referring now to FIG. 3, the rotor shaft 10 has a pair of arcuate cut out grooves 22 therein which not only accommodate lead wires to the slip rings 13 but also one of the grooves 22 accommodates a projection (not shown) internally of the body 12 to prevent relative rotation between the slip ring assembly 11 and the rotor shaft 10.

In use, the above described slip ring assembly is formed by press fitting the slip rings 13 onto the body 12 and then passing the slip ring assembly 11 over one end of the rotor shaft 10 until the frusto-conical surface 15 abuts against the corresponding frusto-conical surface on the shoulder 17. In this position, the portions of the clip 20 between the extensions 18 engage behind the shoulder 17 to hold the slip ring assembly 11 in position on the rotor shaft 10 with the projection engaging in one of the grooves 22.

Referring now to FIGS. 4 to 6 of the drawing, the electrically insulating body of the slip ring assembly is constructed in much the same way as the body 12 of the previous embodiment and corresponding parts are given the same reference numeral prefixed by the reference numeral 1. In this embodiment, body 112 has extensions 118 projecting integrally therefrom in the manner of extensions 18 but in this embodiment the spring clip 20 and grooves 19 are replaced by projections 123 which are integral with the respective extensions 118 and extend radially inwardly towards one another. In this embodiment, the resilient nature of the extensions 118 permit the projections 123 to flex outwardly when being passed over the annular shoulder 17 on the rotor shaft 10. Subsequently, the resilient nature of the extensions 118 cause the projections 123 to move radially inwardly behind the shoulder 17 so as to retain the slip ring assembly on the rotor shaft 10. It will be seen, in this embodiment, that the body 112 has a frusto-conical surface 115 thereon corresponding to frusto-conical surface 15 of body 12 and that the projection which was not previously shown due to the section chosen in FIGS. 1 and 2, is now shown and referenced 124. Apart from the above difference, the body 112 is formed and operates in the same manner as body 12.

Referring now to FIGS. 7 and 8 the embodiment illustrated therein is very similar to that of FIGS. 4 and 5 and similar parts have been accorded the same reference numeral with the exception that the prefixed numeral 1 has been replaced by numeral 2. In this embodiment, body 212 is provided with central bore 214 but is not provided with a frusto-conical surface similar to surface 115. Instead, the bore 214 terminates without any substantial increase in cross-sectional area at end 225 of the body 212. The body 212 is provided with extensions 218 and projections 123 of the embodiment of FIGS. 4 to 6. In this embodiment, the shaft 10 engages the body 212 over the annular surface defined by bore portion 221 and also against end 225 around bore 214.

The slip ring assemblies described above may be produced by moulding the bodies separately and press fitting the slip rings thereover as described above, or alternatively the assemblies may be produced by supporting the slip rings in axially spaced relationship in a suitably configurated mould and effecting an injection moulding operation to form the body of the slip ring assembly within the slip rings.

I claim:

1. A slip ring assembly for a rotary electric machine, comprising an electrically insulating body, a pair of slip rings carried on the body, in spaced relationship, said body having an axial bore therein adapted to receive one end of a rotor shaft of a rotary electric machine, and resilient clip means carried by said body and adapted to engage, in use, behind a shoulder on said rotor shaft.

2. A slip ring assembly as claimed in claim 1 wherein said resilient clip means comprises a pair of angularly spaced, resilient extensions projecting from said body substantially parallel to the longitudinal axis thereof, and provided with inwardly facing projections thereon.

3. A slip ring assembly as claimed in claim 1 wherein said resilient clip means comprises a pair of angularly spaced extensions projecting from the body substantially parallel to the longitudinal axis thereof, and having grooves in their radially outermost surfaces, and, a resilient ring mounted in said grooves so that portions of the resilient ring extending between said extensions engage, in use, behind said shoulder of said rotor shaft.

4. A slip ring assembly as claimed in claim 1 wherein an inwardly projecting shoulder in the bore limits insertion of one end of said rotor shaft, in use, into the bore.

5. A slip ring assembly as claimed in claim 4 wherein said inwardly projecting shoulder is of frusto-conical form, engageable in use, by a corresponding frusto-conical formation on said rotor shaft whereby the slip ring assembly is self centering on the rotor shaft.

6. A slip ring assembly as claimed in claim 1 wherein the slip rings are an intereference fit on the insulating body.

7. A slip ring assembly as claimed in claim 1 wherein the slip rings are secured to the body by moulding the body within the slip rings.

8. A rotor shaft arrangement for a rotary electric machine comprising a rotor shaft, and a slip ring assembly as claimed in claim 1, the resilient clip means of the slip ring assembly being engaged with a shoulder on the shaft to hold the slip ring assembly on the shaft.

* * * * *